United States Patent [19]
Morley

[11] Patent Number: 5,903,996
[45] Date of Patent: May 18, 1999

[54] DAY/NIGHT VIEWING DEVICE WITH LASER RANGE FINDER UTILIZING TWO WAVELENGTHS OF LASER LIGHT, AND METHOD OF ITS OPERATION

[76] Inventor: Roland M. Morley, 401 E. Del Rio Dr., Tempe, Ariz. 85282

[21] Appl. No.: 08/905,227

[22] Filed: Aug. 1, 1997

[51] Int. Cl.$^6$ .................................................. G02B 23/12
[52] U.S. Cl. .............................. 42/103; 42/101; 359/353; 359/419
[58] Field of Search ....................... 42/103, 101; 33/245, 33/246; 359/353, 359, 399, 400, 419, 431

[56] References Cited

U.S. PATENT DOCUMENTS

| | | | |
|---|---|---|---|
| 3,593,194 | 7/1971 | Paine ........................................ | 359/358 |
| 5,084,780 | 1/1992 | Phillips .................................... | 359/353 |
| 5,140,151 | 8/1992 | Weiner et al. ........................... | 359/419 |
| 5,193,025 | 3/1993 | Carlson et al. .......................... | 359/359 |
| 5,225,928 | 7/1993 | Dugan ..................................... | 359/356 |
| 5,703,713 | 12/1997 | Leong et al. ............................. | 359/352 |

Primary Examiner—Stephen M. Johnson
Attorney, Agent, or Firm—Terry L. Miller

[57] ABSTRACT

A multi-function day/night observation, ranging, or sighting device includes a single objective lens and a single eyepiece lens and provides an image of a distant scene. The single objective lens leads to a visible-light first optical path and to an invisible-light second optical path. The invisible-light second optical path includes an image intensifier tube providing a visible image. The first and second optical paths converge with visible images provided by along each path being overlaid at a reticle plane. A single light path leads from the reticle plane to the eyepiece lens. A laser provides laser light projected into the scene, and the image intensifier tube is used as a detector for a portion of the laser light reflected from an object in the scene in order to provide imaging or a laser range finding functions. The device includes provisions for controlling an operating temperature of the laser to a selected one of at least two temperatures which are above ambient temperature, and at which the laser produces laser light of correspondingly differing wavelengths. At least a pair of optical band-pass filters each corresponding to one of the wavelengths of light produced by the laser are available for use during day-time operations in order to improve a signal-to-noise ratio of the device methods of the device's operation are also disclosed.

17 Claims, 5 Drawing Sheets

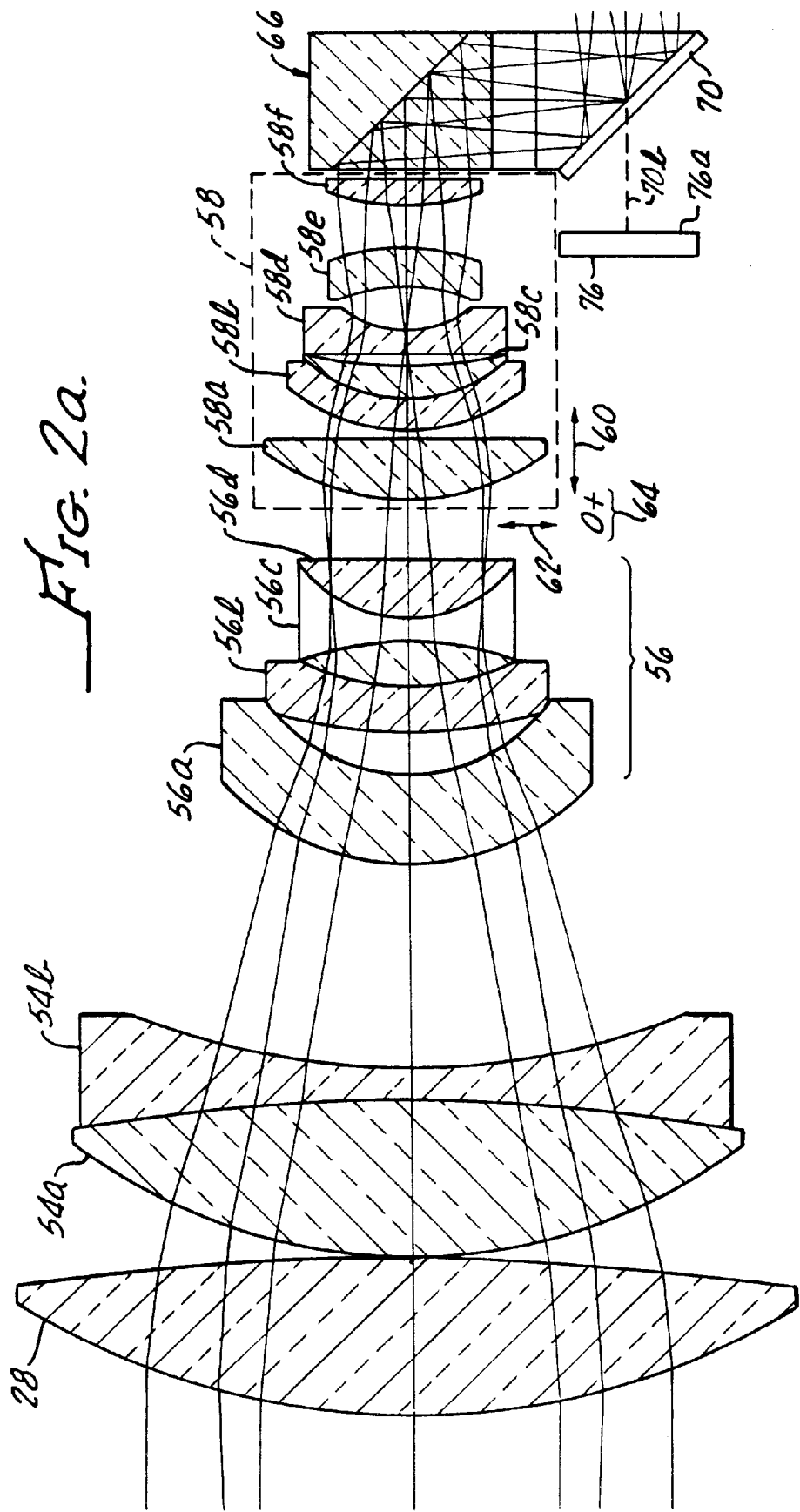

DAY/NIGHT VIEWING DEVICE WITH LASER RANGE FINDER UTILIZING TWO WAVELENGTHS OF LASER LIGHT, AND METHOD OF ITS OPERATION

BACKGROUND OF THE INVENTION

1. Field of the Invention

The present invention is in the field of day-night viewing devices which can be used both in the day time to obtain a view of a scene, and which can also be used at night or under other conditions of low ambient lighting in order to view such a scene. At night the scene is also intensified or amplified by use of an image intensifier tube to provide a visible image when the scene is too dark to be viewed with diurnal vision. Accordingly, this invention relates to such viewing devices which may be used both in day and at night for observation and surveillance.

The present invention also relates to laser range finding apparatus and method. Such laser range finding apparatus and methods ordinarily project a pulse of laser light into a scene. The laser light pulse illuminates objects in the field of view and is partially reflected from at least one object in the scene whose distance from the observer is to be determined. In order to select this one objects the device may include a reticule and the laser light pulse may be of "pencil beam" configuration corresponding to the reticule. The reflected portion of the laser light pulse is detected at the devices and the transit time for the laser light pulse to travel to and from the object is used to calculate a range to the object using the speed of light as a measuring standard.

2. Related Technology

A conventional day/night telescopic sight is known in accord with U.S. Pat. No. 5,084,780, issued Jan. 28, 1992 to E. A. Phillips The Phillips patent appears to teach a telescopic day/night sight which has several alternative embodiments. According to one embodiment set out in the Phillips patent, such a telescopic sight includes a single objective lens behind which is disposed an angulated dichroic mirror. This mirror divides light coming into the sight via the objective lens into two frequency bands. Light of longer wavelengths (lower frequencies) is allowed to pass through the dichroic mirror to an image intensifier tube. This image intensifier tube operates in the conventional way familiar to those ordinarily knowledgeable about night vision devices. That is, the image intensifier tube provides a visible image which replicates a dim image or an image formed by invisible infrared light within the so-called near infrared. Thus, the longer wavelength band which passed through the dichroic mirror includes the infrared portion of the spectrum, and provides to the image intensifier tube the frequencies of light to which the tube is most responsive.

The visible portion of the light entering the Phillips sight via the objective lens is reflected by the dichroic mirror into an optical system leading to a combiner and to an eyepiece. At the combiner, the image provided by the image intensifier tube is superimposed on the image from the visible-light channel of the sights and the resulting combined image is presented to a user of the sight via the eyepiece.

A possible disadvantage of the Phillips sight as described above is that the angulated dichroic mirror can introduce both parallax, astigmatism, and color aberrations into the image provided to the user. Thus, slight movements of the sight may cause the user to experience some shifting of the image along a line parallel with the angulation of the mirrors while the image does not shift along a line perpendicular to this angulation. In other words such an angulated dichroic mirror may result it the slight jiggling inherent in a hand-held telescope or weapon sight amplifying the apparent movement of the image in at least one direction. This effect can be disconcerting for the user of the device.

Other versions of the Phillips sight use a separate objective lens for both the day channel and the night channel of the sight. These versions would not appear to suffer from the same possible parallax problem described above with respect to the versions using the dichroic mirror. However, the versions of Phillips sight with two objective lenses suffer from an increased size, weights and expense because of the additional optics and larger housing required to mount and protect these optics.

In each case with the sight disclosed by Phillips, the optical channels for the night sight and the day sight are laterally offset relative to one another. These two offset optical channels are parallel, and the image from these channels is combined for presentation at the eyepiece. However, in each case, the sight taught by Phillips requires separate laterally offset optical channels, and presents the problem of correctly and precisely superimposing the image from these two channels for the user of the sight.

Another consideration with the Phillips sight is the mechanism and size of housing required for effecting windage and elevation adjustments of the reticule. Some versions of the Phillips sight use a reticule plate, while others use an injected reticule (i.e., provided by a projector for a lighted reticule "dot" which is superimposed on the image of the viewed scene). In each case, the objective lens of the device receives a larger scene image (i.e., field of view) than is provided to the user, and the reticule is moved about within this field of view in order to provide windage and elevation adjustments. However, it is often desirable for the user of such a sight to perceive no apparent change in the centering of the reticule on the field of view. This results in a smaller imaged field of view with a centered reticule pattern moving about in a larger field of view provided by the objective optics. Understandably, optical systems of this type suffer from increased size and weight because of the larger objective optics.

Yet another disadvantage of sights of this conventional type is that the mechanism for moving the reticule is inherently located near the rear of the sights. This location for the reticule mechanism results in the housing of the sight being undesirably large at a location where clearance must be provided for the action mechanisms of many weapons.

Another conventional day/night weapon sight is known in accord with U.S. Pat. No. 5,035,472, issued Jul. 30, 1991 to Charles L. Hansen. The '472 patent appears to disclose a sighting device including a number of dichroic reflectors, which divide the incoming light into spectral bands. The visible one of the spectral bands passes to an eyepiece for viewing by a user of the device. Another of the spectral bands of light passes to an image intensifier tube. A visible image provided by this image intensifier tube then passes to the eyepiece. Yet another spectral band passes to a focal plane array device, such as to a CCD. The CCD is associated with a display device, such as a CRT. The image from the CRT then passes to the user via the eyepiece.

The device disclosed in the '472 patent appears not to provide laser range finding. No provisions appear to be made for a reticule usable in sighting by use of this device. Focusing and adjustment of a reticule position for windage and elevation also appear not to be addressed by the '472 patent.

Conventional laser range finders have also been known for a considerable time. One exemplary version of such a device is known as the MELIOS. This device uses viewing optics, a laser having a projection optical system, and a detector having a separate receiving optical systems all directed at a scene in which an object is located having a range to be determined. In operation, the laser provides a pulse of laser lights and this is projected into the scene via the projection optics. This laser light illuminates the object, and a portion of the laser light is reflected back toward the device. Part of the reflected laser light returning to the device is captured by the receiving optical system, and is directed to a detector. The device includes a timer starting when the laser light pulse is transmitted and stopping when the returning laser light is detected. A calculator portion of the device uses the elapsed time from transmission of the laser light pulse until detection of the returning reflected laser light to calculate the distance to the object.

Another conventional laser range finder is known as the Commander's Viewer Sight. This device uses a catadioptric optical viewing system, and places separate optics for projecting and detecting the laser light in the central obscuration of the viewing optical system. Thus, the viewing optics and laser range finder optics (i.e., projector and detector optics) are coaxial in this sight, but they are nevertheless separate optical structures.

Still another device which includes a laser and an imaging system responsive to reflected laser light from a scene is known as the TLOS system. This system allows observation of retroreflective optical targets in a scene by projection of a train of laser light pulses and timed operation of an image intensifier tube with a delay interval accounting for imaging objects within a range envelope in the scene. The TLOS device requires use of an optical filter during day time operations, which optical filter passes substantially only the wavelength of light provided by the laser. Pulses of laser light. This optical filter eliminates optical "noise" resulting from light of other wavelengths to which the image intensifier tube is responsive. Such light is rich in the day-time scene. A long standing problem with devices such as the TLOS is that the conventional laser requires temperature stabilization to stabilize the wavelength of laser light projected at the wavelength passed by the optical filter.

In the case of portable devices which are battery operated, such temperature stabilization of a laser light source represents a significant and undesirable energy expenditure requirement.

SUMMARY OF THE INVENTION

In view of the deficiencies of the conventional day/night viewing and laser range finding devices it is an object for this invention to avoid one or more of these deficiencies.

Further to the above, it is an object for this invention to provide a day/night viewing and laser range finding device which includes a laser light source having a duality of operating temperatures, both of which are temperature stabilized, and which accordingly provides a duality of laser light wavelengths which are both accommodated by a respective duality of optical filters.

Still further it is an object for this invention to provide a day/night sight comprising; a tube device receiving light from a distant scene and responsively providing an output; a laser having a temperature of operation and projecting laser light into the distant scene; means for controlling the temperature of operation substantially to a selected one of at least two differing temperatures, at each one of which the laser provides laser light of a corresponding one of two differing wavelengths; at least a pair of optical band-pass filters each passing a respective wavelength of light corresponding to a respective one of the two differing wavelengths.

Yet another objective for this invention is to provide a method of operating a day/night viewing devices the method comprising steps of: providing a tube device for receiving light from a distant scene and utilizing the tube device to responsively providing an output; providing a laser having a temperature of operation and projecting laser light into the distant scene; utilizing the temperature of operation of the laser to control the wavelength of laser light produced by the laser, and controlling the temperature of operation of the laser substantially to a selected one of at least two differing temperatures, the laser providing laser light of a corresponding one of two differing wavelengths; providing at least a pair of optical band-pass filters each passing a respective wavelength of light corresponding to a respective one of the two differing wavelengths.

Another object is to provide a day/night observation device including a laser having a temperature of operation and projecting laser light into a scene to provide an image by operation of the device, the laser light having a wavelength dependent upon the temperature of operation of the laser; the observation device comprising: an objective lens receiving light from the scene; an image intensifier tube receiving light from the scene via the objective lens, and responsively providing a visible image; an eyepiece lens providing the visible image to a user of the device; a laser projecting pulses of laser light into the scene to illuminate this scene and provide an image; at least a duality of spectral band-pass optical filters selectively movable to pass light between the objective lens and the image intensifier tube; and heat control means responsive to ambient temperature to control the temperature of operation of the laser above ambient temperature to one of at least a duality of temperatures; whereby the operating temperature of the laser is controlled to one of the at least a duality of temperatures dependent upon ambient temperature in order to decrease heat loss from the laser and the heat control means to ambient.

An advantage of the present invention resides in its combination within a single device of day and night (i.e., night vision) viewing devices, and a laser range finder which has an improved efficiency of operation because of utilizing a duality of laser light wavelengths for laser range finding operations. Uses for this device in the military and in law enforcement are apparent.

Additional objects and advantages of the present invention will be apparent from a reading of the following detailed description of one or more preferred exemplary embodiments of the invention taken in conjunction with the appended drawing Figures, in which like reference characters denote like features or features which are analogous in structure or function, as will be explained.

BRIEF DESCRIPTION OF THE DRAWING FIGURES

FIG. 1 provides an exterior view of a telescopic day/night observation, sighting, and ranging device embodying the present invention being used to observe a distant scene as well as to obtain a range to an object in this scene;

FIG. 1a provides an exterior perspective view of the device seen in FIG. 1 viewed from the opposite perspective;

FIGS. 2a and 2b together provide a diagrammatic longitudinal representation, partially in cross section, of the internal structures of the device seen in the preceding drawing Figures;

FIG. 3 provides a diagrammatic presentation of a night vision portion of the device including an image intensifier tube along with spatial and optical filters used in conjunction with this image intensifier tube;

FIG. 4 is a fragmentary diagrammatic perspective view of yet another portion of the device seen in the preceding drawing Figures;

FIG. 5 provides a cut-away perspective assembly view of a portion of the device seen in FIG. 4, with parts of the structure shown broken away or removed for clarity of illustration;

FIG. 6 provides a schematic representation of a control system architecture for the device; and FIG. 7 provides a graphical illustration of a controlled temperature versus ambient temperature for a laser diode of the device.

DETAILED DESCRIPTION OF A PREFERRED EXEMPLARY EMBODIMENT OF THE INVENTION

An overview

Figure 1:
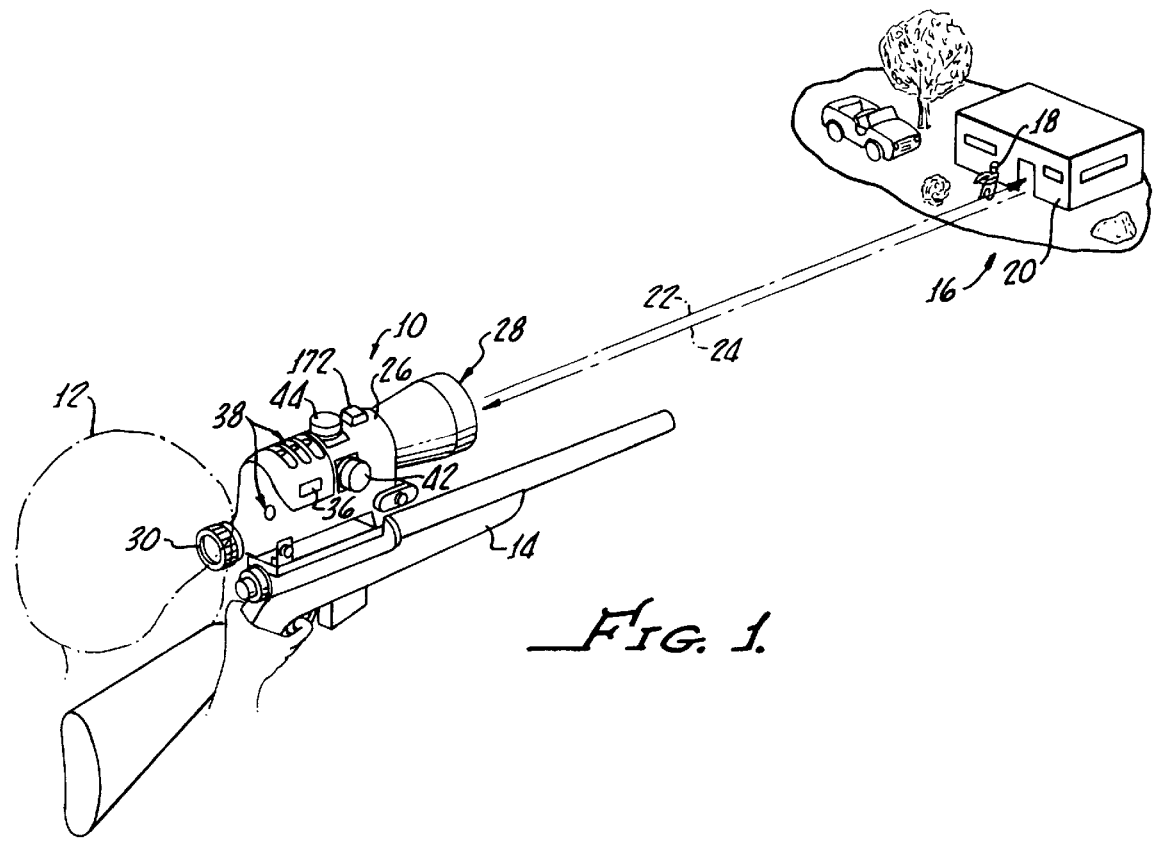
Figure 1A:
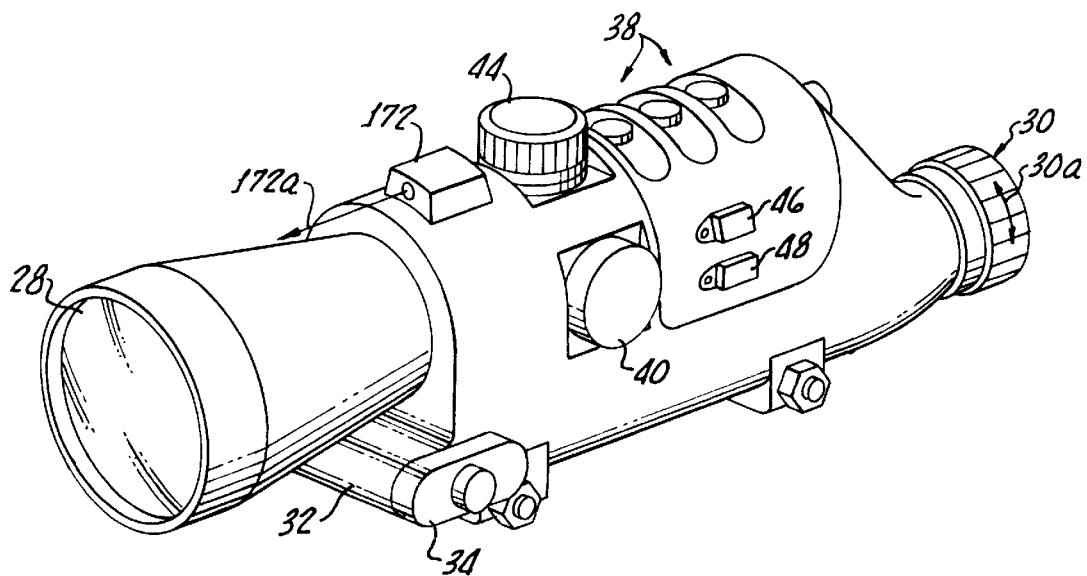

Viewing FIGS. 1 and 1a in conjunction, a telescopic day/night observation and laser range finding device (the "device") is depicted as it may be used by a user 12. In this case, the device 10 is mounted to a rifle 14, and the user 12 is using the device to view a distant scene 16. It will be understood that the device may be used alone without being mounted to a rifle 14, or to any other weapon. For example, the device 10 may be mounted to a tripod for viewing and observation purposes. On the other hand, the device 10 is not limited to use only as a sight for a rifle, and may be used for sighting a variety of weapons. Accordingly, it is seen that the device 10 is not limited to this or any other particular use, and other uses for the invention as embodied in device 10 and in its various other embodiments will be apparent to those ordinarily skilled in the pertinent arts.

In the distant scene 16 are personnel 18, and in the instant case, in addition to being able to observe the scene 16 and personnel 18 the user 12 would like to know the range to these personnel. The personnel 18 may be moving about and are only generally indicated in the scene 16, but in order to obtain a range to this scene 16 the user may select any number of convenient stationary objects in the scene 16 for ranging purposes. By obtaining a range to any one of the stationary objects, an acceptably accurate range to the personnel is also obtained. In the situation depicted, the housing structure 20 would probably be selected by the user 12 for ranging purposes. Alternatively, the user 12 may range to a vehicle, tree, or other natural feature, such as an exposed rock or rock formation, for example, to obtain a range to the scene 16. In the scene 16, a variety of such objects are depicted and are available to the user 12 for ranging purposes.

In order to range to the scene 16, upon a command from the user 12, the device 10 sends out a pulse 22 of laser light. This laser light pulse is of very short duration, and is not visible to the unaided human eye. However, the laser light pulse 22 does illuminate a portion of the scene 16, generally in the center of this scene as viewed by the user 12 via the device 10. Some part of the laser light pulse will be reflected from one or more objects in the scene 16 back toward the device 10, as is indicated by arrow 24. The returning laser light 24 is detected at the device 10, and range information is provided in a selected form to the user. For example, the range information may be presented to the user in numerical form superimposed over the scene 16 as seen through the device 10.

Considering the device 10 now in greater detail, it is seen that device includes a housing 26 which is offset along its length, and which is of stepped outer diameter. These specific features of construction are particular only to the embodiment of the invention depicted in FIGS. 1 and 1a, and the invention is not so limited. The housing 26 at a forward end includes an objective lens 28. The term "forward" as used here has reference to the direction toward an object or scene to be viewed by use of the device, while the terms "rear" or "rearward" refer to the opposite direction toward a user of the devices. In this case, the device 10 has only a single objective lens, and this objective lens 28 is used to receive light from the scene 16, as is indicated by the arrows 28a. The light 28a will include visible light during day-time use of the device 10. Also, the light 28a may include light both in the visible portion of the spectrum, as well as light in the red end of the visible spectrum and in the near-infrared portion of the spectrum during both day-time and night-time use of the device 10, as will be further appreciated in view of the following.

It will be noted that objective lens 28 is also used as a projection lens for projecting the pulse of laser light 22 into the scene being viewed by the user 12. The invention is not limited to laser light pulse 22 projecting into the scene 16 via lens 28, and this should be viewed as a convenience and feature of the particularly illustrated and described embodiment of the invention. In addition, the objective lens 28 is used to receive the returned portion of the laser light pulse after reflection from one of more of the objects in the scene 16.

At its rear end, the device 10 includes an eyepiece 30 into which the user 12 peers to obtain a magnified (i.e., telescopic) view of the object or scene toward which the device 10 is directed. The eyepiece 30 is rotational, as is indicated by arrow 30a, in order to allow the user 12 to focus this portion of the device. The housing 26 also provides a battery housing portion 32 having a removable cap 34 allowing replacement of a battery (not shown in FIGS. 1 or 1a) which is housed in the portion 32. A power switch 36 allows the user 12 to turn on and off a night vision function of the device 100, as will be further described. Also, other operational switches, generally indicated with numeral 38 and to be further described below allow the user to initiate a laser range finding (LRF) operation, and to control other functions of the device 10, as will be more fully explained.

Along the body 26 are located three adjustment knobs generally indicated with the numerals 40, 42, and 44. Knob 40 provides for objective focusing of the device, while knobs 42 and 44 respectively provide for windage and elevation adjustment of a field of view of the scene 16 relative to a fixed aiming reticule of the device 10. A pair of recessed levers 46 and 48 respectively provide for selection of spatial and optical filters to be used in the device 10 during observation and laser range finding operations dependent upon the conditions of use for the device, as will be explained.

Figure 2B:
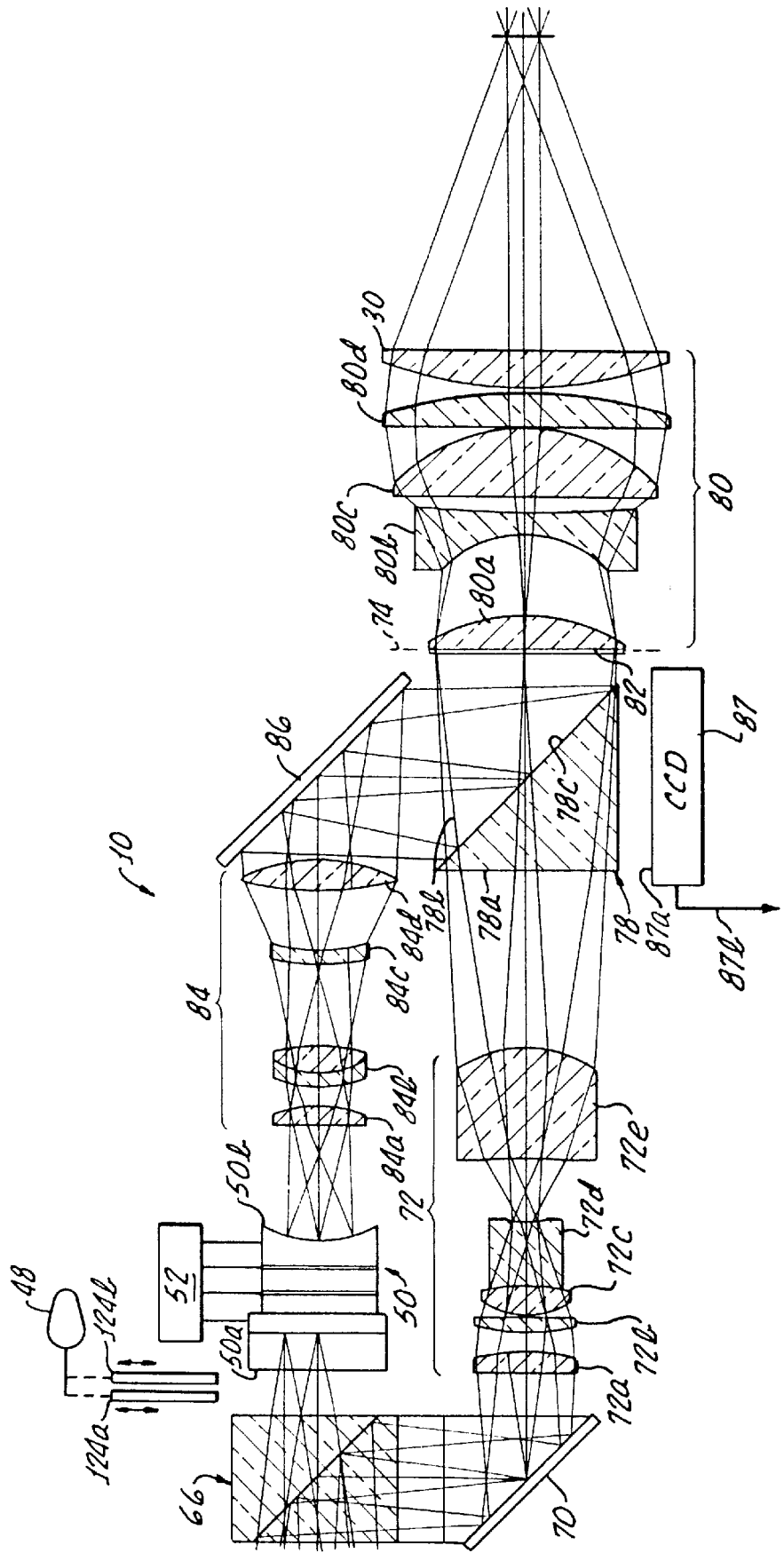

Turning now to FIGS. 2a and 2b and considering this structure in general, it is seen that the device 10 includes a number of lenses in color-corrected groups arranged along a bifurcated and convergent optical pathway leading from the objective lens 28 to the eyepiece 30. That is, an image presented at eyepiece 30 may be considered to have traveled along either one or both of the branches of the optical pathway. One branch of this pathway includes an image intensifier tube 50 so that the image presented at eyepiece 30 from this branch of the optical pathway is derived from light admitted to this pathway via objective lens 28, but is a replica image as will be further explained.

As those ordinarily skilled in the pertinent arts will know, such an image intensifier tube provides an image when it receives visible light or light in the near-infrared portion of the spectrum and is supplied with electrical power of appropriate voltage and current levels by a power supply circuit 52. This power supply circuit 52 draws its electrical power from a battery stowed in the battery housing portion 32 under control of the on/off switch 36. Under night-time or other conditions of low ambient lighting level, the image intensifier tube 50 will provide a visible image replicating an image in low-level visible light or in invisible near-infrared light. However, the image intensifier tube 50 can also be used in day time, and can also be used under marginal lighting conditions of dusk or early dawn, for example, to supplement an optical image provided along the other branch of the device IC. That is, as will be explained, the image intensifier tube can also be used in full daylight to provide imaging functions and other functions to be described more fully below.

Figure 3:
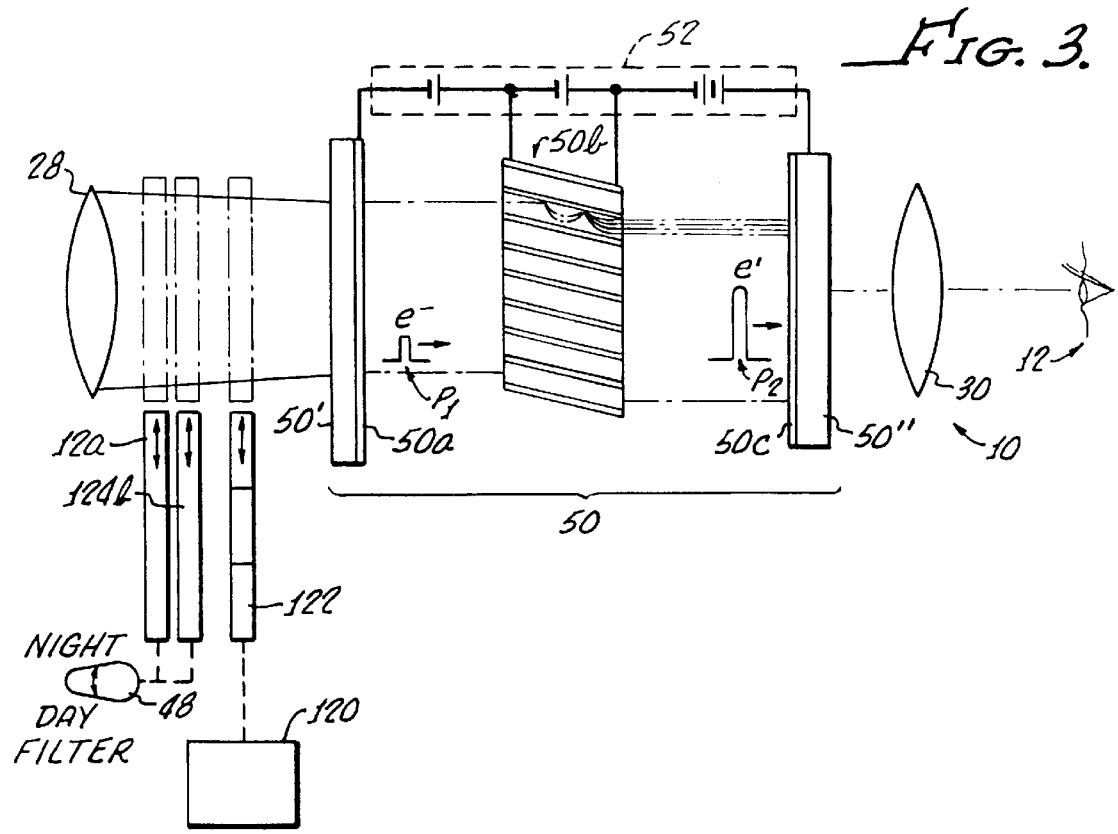

Viewing FIG. 3, it is seen that image intensifier tube 50 includes a transparent window portion 50' behind which is a photocathode 50a responsive to photons of light from a scene to liberate photoelectrons in a pattern replicating the scene, a microchannel plate 50b which receives the photoelectrons and which provides an amplified pattern of secondary emission electrons also replicating this scene, and a display electrode assembly 50c. Generally, this display electrode assembly has an aluminized phosphor coating or phosphor screen. The electron pattern impacting on this screen creates a visible image replicating the scene. A transparent window portion 50" of the tube conveys the image from this output electrode assembly (or "screen") outwardly of the tube so that it can be presented to the user 12.

Typically, power supply 52 will apply an electrostatic field voltage on the order of 200 to 800 volts to the photocathode in order to allow it to liberate photoelectrons in response to incident photons. Preferably, a constant voltage level of 800 volts is provided by the power supply 52 for connection to the photocathode of the image tube 50. As will be further explained, this constant voltage is controllably, and possibly variably, gated on and off of connection to the photocathode in order to control brightness of the image presented to user 12, both to allow a laser range finding function to be carried out by the device 10, and possibly to allow the user 12 of the device to manually control the brightness level of the image or the gain provided by the image intensifier tube 50 of the device.

After accelerating over a distance between the photocathode 50a and the input surface of microchannel plate 50b, the photoelectrons enter microchannels of the microchannel plate. The power supply 52 maintains a selected voltage differential across the opposite faces of this microchannel plate (i.e., across conductive electrode coatings carried on these faces) so that the photoelectrons are amplified by emission of secondary electrons to produce a proportionately larger number of electrons upon passage through the microchannel plate. This amplified shower of secondary-emission electrons is also accelerated by a respective electrostatic field generated by power source 52 to further accelerate in an established electrostatic field between the second face of the microchannel plate and the screen. Typically, the power source 52 produces a field on the order of 3,000 to 7,000 volts, and more preferably on the order of 6,000 volts during imaging operations in order to impart the desired energy to the multiplied electrons. This amplified shower of electrons falls on the phosphor of the screen to produce an image in visible light. During laser range finding operations of the image tube 50 this applied differential voltage is preferably increased to a "high gain" level, as will be explained.

Considering now the optical elements of the device 10, it is seen that the objective lens 28 admits light from the scene to a lens group 54 which includes doublet lenses 54a, 54b. These lenses project the light to an afocal lens set including lenses 56a–56d. Light exiting lens 56d is substantially collimated. The light from lens set 56a–56d is directed to a movable focus cell, generally indicated with the arrowed numeral 58. This focus cell 58 includes lenses 58a–58f, and is effectively a second smaller and relatively movable objective lens set in the device 10. As will be explained further below, the focus cell 58 is movable axially for focusing as is indicated by arrow 60; is movable vertically for elevation adjustment, as is indicated by arrow 62; and is movable laterally for windage adjustment, as is indicated by arrow 64 (the dot-centered circle and cross respectively indicating the head and tail of a focus cell movement arrow perpendicular to the plane of FIGS. 2). The objective lens sets 28, 54, 56, and focus cell lenses 58 cooperatively effect a first inversion of the image of the scene.

Light exiting lens 58f is focused to a distant image plane, and as will be further described is to be divided into two spectral bands. Thus, the light exiting lens 58f is focused to two separate image planes dependent upon the wavelength band of the light. Understandably, the longer wavelengths of light will be focused to an image plane at the photocathode 50a of the image intensifier tube 50. The shorter wavelengths of light (i.e., visible light 28a(v)) are focused to an image plane to be identified below. Also, recalling the description above of the operation of the image intensifier tube 50 it will be understood that the lenses from and including objective lens 28 through the lens 58f have an image plane at the photocathode of the image intensifier tube 50. In response to this light 28a(ir), the image intensifier tube 50 can provide a visible image.

Figure 4:
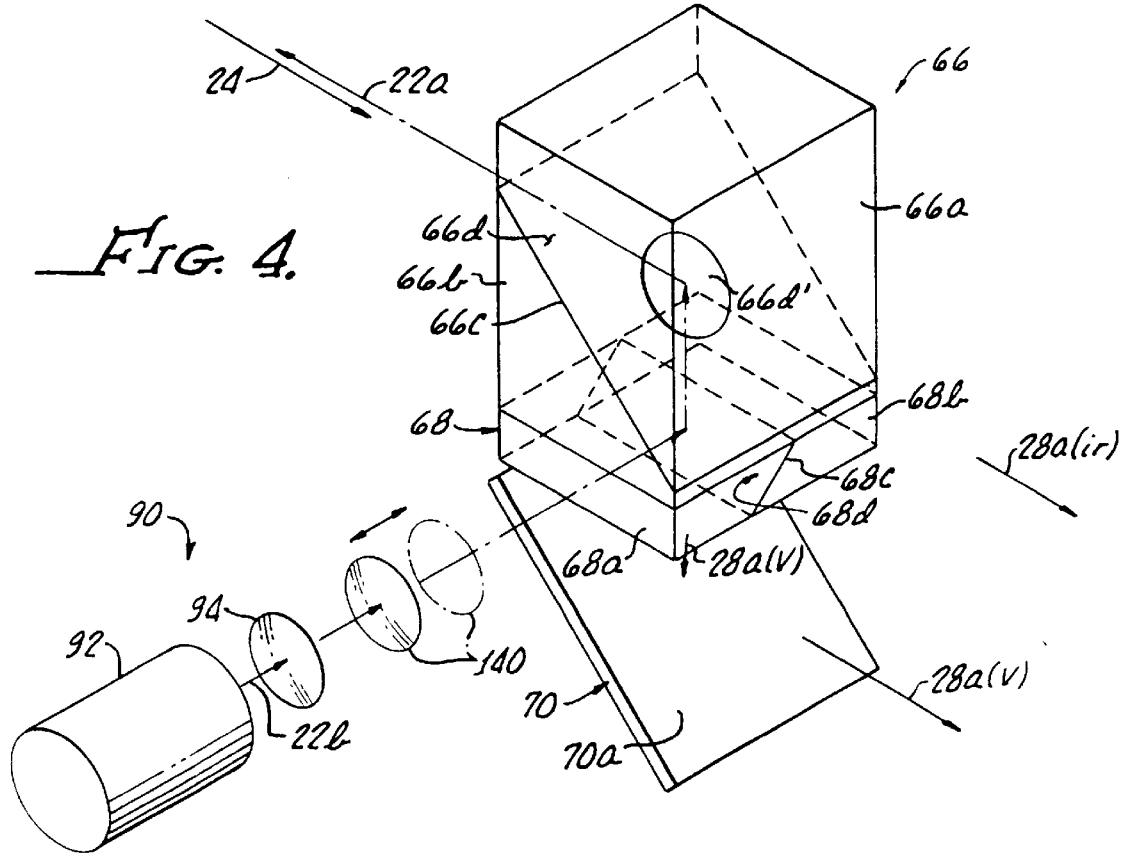

Next, the light which has entered device 10 via objective lens 28 encounters a prism assembly 66 which is seen in FIGS. 2, but is best seen in FIG. 4. The prism assembly 66 includes a first and a second prism members 66a and 66b, which have an angulated interface 66c. As is seen, the interface 66c is angulated so that incoming light from the objective lens 28 will be reflected downwardly. However, interface 66c is provided with a reflective-transmissive dichroic coating, indicated with arrowed numeral 66d. Also, a central oval portion of the dichroic coating 66d is provided with an especially spectrally-selective dichroic coating portion 66d', as is further described below. Importantly, the dichroic coating 66d selectively passes longer wavelengths of light (i.e., from about the blue portion of the visible spectrum through the red portion and on into the near-infrared portion of the spectrum). As will be further explained, the spectrally-selective coating portion 66d' has a weighted average transmissibility of wavelengths to which the image intensifier tube 50 is responsive of about 70%. Thus, the longer wavelengths of light (indicated with arrows 28a(ir) pass through the prism assembly 66, and are focused through the front transparent window 50' of the image intensifier tube 50 onto the photocathode 50a of this tube, viewing FIG. 3 once again.

However, a significant portion of the light in the visible portion of the spectrum [indicated by arrows 28a(v)] is reflected from the dichroic coating 66d at interface 66c, and passes downwardly through another plate-like prism assembly 68, which is a portion of the prism assembly 66. Prism assembly portion 68 includes two plate-like members 68a and 68b, which cooperatively define an interface 68c angulated at 45 degrees with respect to the vertical and directed laterally of the device 10. On this interface 68c is located another coating 68d of the spectrally-selective coating material used for area 66d'. The visible light wavelengths (28a (v)) substantially pass through this interface and through the coating 68d. The light passing downwardly through portion 68 reflects from a beam splitter mirror 70 having a first-surface reflective-transmissive surface 70a. Thus, the light 28a(v) is reflected from surface 70a rearwardly of the device 10 toward eyepiece 30.

Behind the beam splitter mirror 70 (i.e., toward the eyepiece 30, and viewing FIGS. 2a and 2b once again) is it seen that device 10 includes a lens group 72 including lenses 72a–72e, and having two image planes. In the direction toward the eyepiece 30, the lens group 72 has an image plane at the location indicated by dashed line 74 and effects a second inversion of the image of the scene, so that an erect image is presented at plane 74. On the other hand, in the direction away from eyepiece 30, the lens group 72 has an image plane located at the plane of a face 76a of a light emitting diode (LED) display 76. The function of this display will be further described below.

Next, light passing toward the eyepiece 30 encounters a combiner prism 78, having a first prism portion 78a and second prism portion 78b, cooperatively defining a reflective-transmissive interface 78c. Light from the prism assembly 70 (and from the display 76 as well, as will be explained) passes through this prism assembly, passing through the image plane 74e and to the eyepiece optics which are generally indicated with numeral 80 and which include eyepiece lens 30. It will be noted that these eyepiece optics 80 are non-inverting However, at the plane 74 is disposed a reticle plate 82. This reticle plate includes a selected reticle pattern, such as a cross-hair. For purposes of allowing the device 10 to be used in sighting a weapon. The image of the reticle pattern is seen by user 12 superimposed on the image of the scene 16. Further considering the eyepiece optics 80, it is seen that these optics include lenses 80a–80d, and eyepiece lens 30. As noted above, relative rotation of the housing portion 30a moves the eyepiece optics group 80 axially of the housing 26 and focuses the eyepiece lens group at plane 74.

Considering now the image presented by image intensifier tube 50 at window 50", it is seen that this image is inverted because of the first inversion of the image effected by the objective lenses, as explained above. The image intensifier tube 50 is of non-inverting type, and also provides an inverted image at window 50". A relay lens group, indicated with numeral 84 includes lenses 84a–84d, has an image plane at plane 74, and effects a reversion of the inverted image presented by tube 50 so that an erect image is presented to the user 12 at plane 74. The image from image intensifier tube 50 is overlaid at the image plane 74 with any visible-light image (i.e., formed by light 28a(v)) so that the user 12 can see these two images superimposed on one another if both are present. At night and under other low-light conditions, the visible-light image will be fully or substantially absent, and the user will see the image from the image tube 50. Light from the relay lens group 84 is directed by a mirror 86 downwardly into combiner prism 78, to be reflected from the interface 78c toward the eyepiece 30.

Stated differently, the visible light image provided by light 28a(v), and the image presented by the image intensifier tube 50 in response to the light 28a(ir) are superimposed on one another at the image plane 74, and are viewable each alone or together at the eyepiece 30 (i.e., the user is looking at image plane 74). Thus, under day-light conditions, the device 10 may be used using only visible-light imaging, or may combine visible light imaging with the image provided by the image intensifier tube 50, if desired (i.e., even in full day-light conditions, as will be explained) At night-time and under other low-light conditions, the device 10 provides night vision using the image from the image intensifier tube 50.

Further to the above, it will be noted that the light focused to the image plane 74 by lens groups 72 and 84 can also pass through the prism 78 in a downward direction, with the light from lens group 72 being reflected partially from interface 78c. Light from lens group 84 partially transmits through the interface 78c. Thus, yet another image plane is present at a front face 87a of a light responsive electronic imaging device 87. The imaging device 87 may include, for example, a charge coupled device. Other types of electronic imaging devices may be employed at this image plane (i.e., at the plane indicated at 87a) in order to capture electronically an image using the device 10. As a result, the device 10 can provide an image via an electrical interface indicated by conductor 87b.

Laser Injection for Laser Range Finding and Imaging

Returning to a consideration of FIG. 4, it is seen that the prism assembly 66, including portion 68, is associated with a laser light projection assembly 90. This laser light projector assembly originates a laser light pulse, which when projected outwardly into the scene 16 via the objective lens 28, becomes pulse 22. In order to provide a pulse of laser light projected from the prism assembly 66 forwardly through the objective lens 28, as is indicated with arrowed numeral 22a, the assembly 90 includes a laser diode 92, which when energized provides a pulse of laser light indicated with numeral 22b. Preferably, this laser light pulse has a wavelength of about 820 nm, which is in the infrared portion of the spectrum and is not visible to humans The pulse of light 22b is projected through a stationary lens 94 toward a selectively movable lens 96. Lens 96 is illustrated in solid lines in FIG. 4 in its position to provide a "pencil beam" of projected laser light as pulse 22, recalling FIGS. 1 and 1a and the discussion concerning objects in the scene 16 which may be different in reflection of laser light and which may be selected for laser ranging in the scene 16. The lens 96 is selectively moveable under control of the user 12 between the position in solid lines in FIG. 4 and an alternative position shown in dashed lines in this Figure.

In the dashed line position of lens 96 in FIG. 4, the lens 96 causes the pulse of light 22 to have a divergence of about 2 degrees. This causes the laser light pulse 22 to illuminate a portion of the scene 16 which varies in size according to the distance between the device 10 and the scene 16. Understandably, by selection of the area of the scene illuminated by the laser light pulse 22 in view of the magnitude of the reflection from the object to which laser range finding is being performed the user 12 can choose a combination of object(s) reflection intensity and area of illumination giving the best possible laser range finding results.

The light of laser light pulse 22b is projected by lens 96 into the prism member 68a, and reflects from coating 68d upwardly to prism assembly 66. In the prism assembly 66e the laser light pulse 22b is incident upon the coating portion 66d', which for this wavelength of light provides an almost perfect reflection of about 99 percent. Consequently, the laser light pulse 22b is directed forwardly and exits the prism assembly 66 as laser light pulse 22a, as noted above. It is to be appreciated that the coating portion 66d' provides a nearly perfect reflection at the shorter wavelengths of visible light which must be reflected from this coating downwardly to pass to eyepiece 30. At the longer infrared wavelengths, the coating 66d' has a low magnitude of reflection, and has a transmissibility weighted over the wavelengths to which the image intensifier tube 50 is responsive of about 70%.

Further, viewing the ray trace of FIGS. 2a and 2b, it is seen that a significant portion of the light which is focused at the image tube 50 passes around the portion of interface 66c where the area of coating 66d' is located. Accordingly, each area of the photocathode of the image tube 50 will receive sufficient light that a significant shadow is not cast by the coating portion 66d'. Considered from an optical analysis approach, the light received in the center of the image tube will be about 91% of the possible light level were the coating 66d' not present. In other words, the image provided by image tube 50 does not have a shadow or darkened area because of obscuration from coating portion 66d'.

Again, at the longer light wavelengths centered around the 820 nm wavelength for laser light pulse 22, it will be appreciated that the coating 68d' has a magnitude of reflection which averages better than 80 percent. Accordingly, the laser light pulse 22b from laser diode 92 is reflected from the coatings 68d at interface 68c, and from coating 66d' at interface 66c, to be projected forwardly as pulse 22a (viewing FIG. 7) and to become pulse 22 when it is projected from the objective lens 28 into the scene 16.

Further considering this projection of pulse 22, it is seen that the laser light 22b/22a has a path outwardly of the device 10 through the focus cell group 58 and through the other lenses leading to and through objective lens 28 which is opposite to the incoming light from the scene 16 In this way, a user of the device can select an object with which to perform a laser range finding operation by setting the reticule pattern on this object and commanding a LRF operation.

Figure 5:
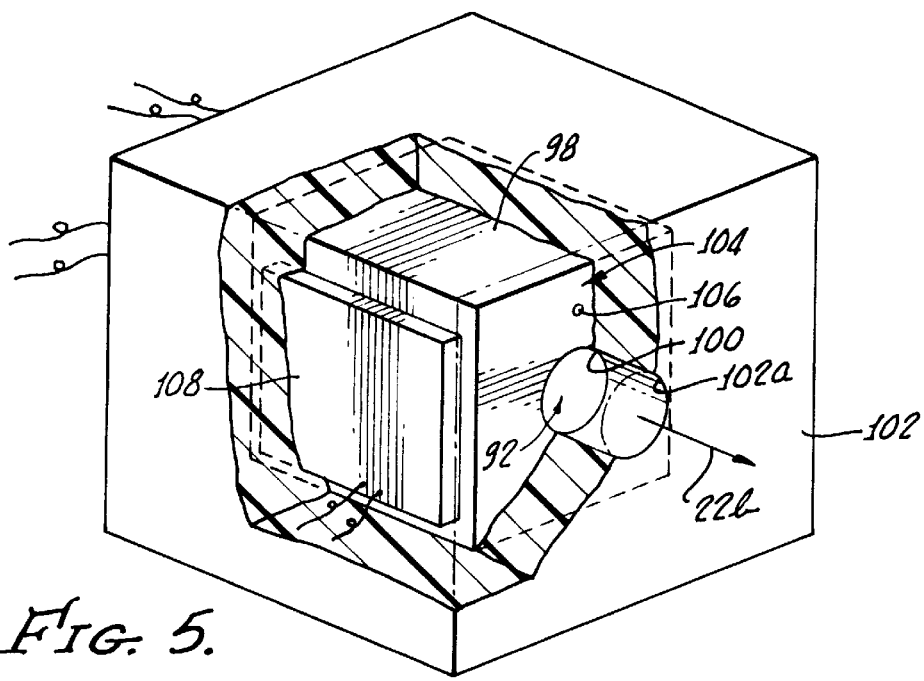

Temperature Stabilization of Laser 92 for Operation at Two Differing Wavelengths Considering now FIG. 5, details of the construction for the mounting of laser diode 92 are shown. The device 10 includes a block 98 of material which has a high coefficient of thermal conductivity Preferably, the material from which block 98 is formed is copper. This block 98 defines a through bore 100 which receives the laser diode 92. Those ordinarily skilled in the pertinent arts will understand that laser diodes produce a different wavelength of light dependent upon their temperature. In order to control the temperature of the laser diode 92 and the wavelength of the light it produces, the laser diode is closely received in heat transfer relation in and is housed in the bore 100 of block 98. Further, the temperature of this block is maintained at a selected one of at least two differing temperatures. Additionally, isolation from ambient temperature conditions is provided by a mass of insulation material 102 which surrounds the block 100 and laser diode 92, providing a bore 102a for passage of the laser light outwardly of the laser diode 92.

Closely adjacent to the bore 100 is a second bore 104, which receives a temperature sensor 106. The sensor 106 provides an electrical signal over wires 106a, which is indicative of the temperature of block 98, and of laser diode 92. In order to heat and stabilize the temperature of block 98 at a temperature above ambient, a pair of plate-like surface-contact heaters 108, only one of which is seen in FIG. 5, contact opposite sides of the block 98 in heat transfer relation. These heaters 108 have electrical leads for providing power to the heaters.

Figure 6:
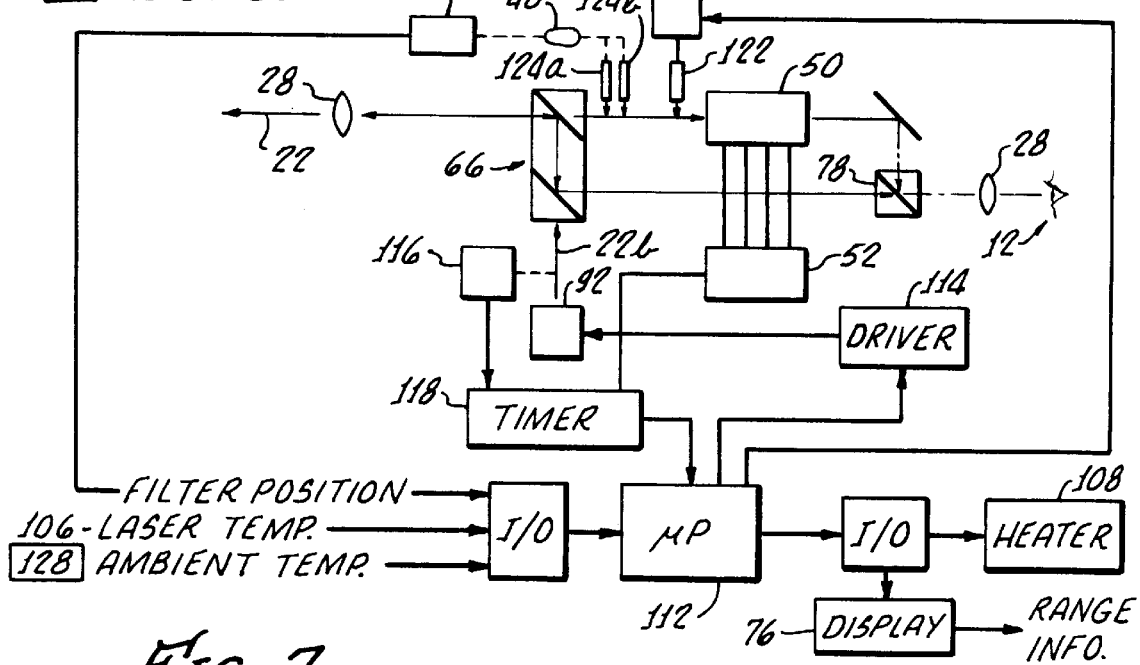

Considering now FIG. 6, it is seen that the device 10 includes a laser range finding control circuit 110 which at a microprocessor portion 112 receives a LRF control input from the user 12 via a switch 38 commanding the device 10 to perform a laser range finding operation In response to this LRF control input, the control circuit 110 commands the power supply 52 to switch the photocathode 50a of the image intensifier tube 50 momentarily to a positive source of voltage. Preferably, this positive source of voltage may provide about +30 volts to the photocathode 50. After a selected time interval the photocathode is connected to a source of negative voltage. Preferably, the photocathode is connected to about −800 volts. In timed coordination with the connection of the photocathode 50a with the negative voltage source, the control circuit 110 provides an input to the laser diode 92 via a laser power supply 114. The laser diode 92 responsively provides the pulse of laser light 22b, which will become the pulse 22 projected via the objective lens 28 into the scene 16, as described above. A sensor 116 senses the pulse 22b, and provides a starting command to a timer 118.

The laser light pulse 22 is projected into the scene 16 as described above in timed coordination with the connection of the photocathode 50a to the −800 volt source. Thus, the photocathode 50a is in a highly responsive condition for receipt of photons of light from returning light pulse 24. In this same interval, the control circuit 110 provides an input command to an actuator 120. The actuator 120 moves a spatial filter 122 into the light path (i.e., the path for light 28a(ir)) between prism 66 and image intensifier tube 50. This spatial filter is essentially an opaque blocking plate or shutter which defines a central aperture allowing reflected laser light to be returned to the image intensifier tube from a selected central portion of the scene 16.

Also, dependent upon the position of lever 48, one or the other of at least two different optical band-pass filters 124a/124b may have been manually moved into the light path between prism 66 and image intensifier tube 50, viewing FIGS. 2. The optical filters 124a/b are each of a band-pass type, and each transmits light substantially at a different wavelength while filtering out light on each side of the notch band-pass. For example, one filter 124a may transmit light substantially at 790 nm, while the other transmits light substantially at 820 nm. These wavelengths are simply exemplary and are not specific nor limiting of the invention. One or the other of these spectral filters will be used during daytime operation of the device 10 for observation or laser range finding operations, dependent upon the ambient temperature conditions. During day-time observation and laser range finding operations, use of the optical filters 124a or 124b filters out other adjacent wavelengths of infrared light which may be rich in the day-time scene, and thus improves the signal to noise ratio for the image intensifier tube 50 in its mode of operation as a sensor for laser range finder operations and for imaging using light provided by the laser diode 92.

Further, as is described above during a laser range finding operation the returning laser light 24 reflected from an object in the scene 16 is received by image tube 50 after the photocathode has been connected to the −800 volt source and is very responsive to the returning laser light. The connection to the −800 volt level is maintained for a sufficient time interval to insure that the returning laser light pulse is received by the tube 50 while the photocathode is highly responsive to photons. Further, the microchannel plate of the image tube 50 has a voltage differential applied across it which makes it have a high gain level. As may be appreciated, the microchannel plate for imaging purposes may have a differential voltage applied which is less than the full high-gain differential voltage level. This may be the case, for example, because viewing conditions are bright, or because a bright source of light is present in the viewed scene. Regardless of the reason for the microchannel plate of the image tube having less than the high-gain level of voltage differential applied, when a LRF operation is commanded, this differential voltage across the microchannel plate is changed to a high-gain level substantially simultaneously with the application of the high-response voltage to the photocathode.

Consequently, in response to the reflected portion 24 of the laser light pulse 22, the tube 50 experiences an electron pulse (indicated on FIG. 3 with arrowed characters "e-". This electron pulse is amplified by the microchannel plate, producing a current pulse from the screen 50c. The current pulse is sensed by a connection through the power supply 52 into timer 118. The timer thus stops, with the interval of its operation measuring the time required for light to travel to and from the scene 16. This measured time interval is read by microprocessor 112 and the distance to the scene is calculated using the speed of light as a measuring standard. The microprocessor 112 then provides a range output via the display 76. As mentioned above, the display provides an image which shines though the reflector 70 and combiner prism 78 and is visible to the user 12 in eyepiece 30.

Further viewing FIG. 6, it is seen that the control system 110 includes a sensor 126 providing an input indicative of which one of the optical filters 124a and 124b is inserted into the light path to image intensifier tube 50. The temperature sensor 106 provides an input to the microprocessor circuit 110, as does an ambient temperature sensor 128. Accordingly, the circuit 110 provides an output to heater 108 to effect one or the other of two stabilized temperatures for laser diode 92. In view of the above, it is seen that one function of the microprocessor based control circuit 110 is as a temperature controller responding to the temperature sensors 106 and 128 to select one of the lower or higher temperatures indicated in FIG. 7 and effect control of the temperature of the laser diode 92 to this temperature by turning heaters 108 on and off.

The circuit 110 may implement a variety of different temperature control algorithms For example, a PID (i.e., proportional-integrative-derivative) type of temperature control scheme may be implemented by appropriate programming of microprocessor 112. However, a simple deadband, time-proportional control algorithm has proven to be adequate. With proper selection of the thermal mass of block 98, the wattage of heaters 108, and the dead band and time proportionality constant of the control algorithm (i.e., "on" time for heaters 108 as a function of a temperature error signal between the temperature sensed by sensor 106 and the set temperature for laser diode 92) a temperature control within +/−3° C. for the laser diode 92 can be effected. This degree of precision for the operating temperature for the laser diode has been shown to be adequate to stabilize the wavelength of light produced by the laser diode within the particular band passes of the filters 124a and 124b.

Figure 7:
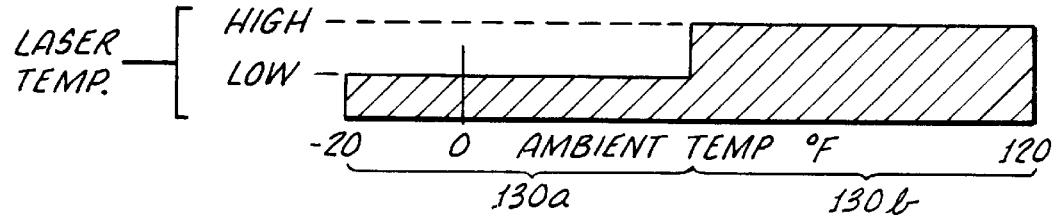

That is, during low ambient temperature conditions indicated on FIG. 7 with the numeral 130a the temperature of laser diode 92 is controlled at a first lower temperature. On the other hand, during ambient temperature conditions falling in the range 130b, the temperature of laser diode 92 is controlled at a higher temperature. As explained above, the wavelength of light produced by laser diode 92 is a function of its temperature. Accordingly, two different wavelengths are produced during LRF operations, which correspond to a particular one of the optical filters 124a and 124b. In the event that the operator of the device 10 has the wrong filter inserted into the light path to image intensifier tube 50e the circuit 110 will alert the operator to this by means of a character produced by display 76 and visible via eyepiece lens 30.

As an example only, the ambient range 130a seen in FIG. 7 may extend from about −20° F. to about 50° F., while the lower temperature for laser diode 92 would be perhaps 60° F. The higher range 130b may extend from about 50° F. to about 120° F., with the higher temperature for the laser diode 92 being about 130° F. Again, these numbers are merely exemplary and are not limiting of the invention. However, by this dual-temperature control of laser diode 92, the amount of energy expended in the device 10 for the necessary heating to stabilize the wavelength of the light used for laser range finding and observation operations using light from laser diode 92 is reduced. It will be understood that more than two differing temperatures for the laser diode 92, and more than two corresponding optical filters 124 may be employed.

A particular advantage of the present invention is the extended battery life and extended service periods provided for battery-operated versions of the device 10 as disclosed above.

While the present invention has been depicted, described, and is defined by reference to particularly preferred embodiments of the invention, such reference does not imply a limitation on the invention, and no such limitation is to be inferred. The invention is capable of considerable modification, alteration, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

I claim:

1. A sight comprising:
   a tube device receiving light from a distant scene and responsively providing an output;
   a laser having a temperature of operation and projecting laser light into the distant scene;
   means for controlling said temperature of operation substantially to a selected one of at least two differing temperatures, at each one of which the laser provides laser light of a corresponding one of two differing wavelengths.
   at least a pair of optical band-pass filters each passing a respective wavelength of light corresponding to a respective one of said two differing wavelengths.

2. The sight of claim 1 in which said means for controlling said temperature of operation of said laser includes a temperature sensor responsive to said temperature, a heater in heat transfer relation to the lasers and a controller receiving said temperature signal and controlling said heater.

3. The sight of claim 1 wherein said tube device includes an output electrode, said output electrode including a phosphor screen providing a visible output.

4. The sight of claim 2 wherein said laser includes a laser diode, said means for controlling said temperature including a mass of material having a high heat transfer coefficient, and said mass of material having means for mounting said laser diode in heat transfer relation, said heater being in heat transfer relation with said mass of material, and said controller controllably operating said heater to stabilize the temperature of said mass of material and of said laser diode at a selected temperature.

5. The sight of claim 4 further including a mass of insulating material surrounding said mass of material, said mass of insulating material defining a passage allowing for passage outwardly of laser light from said laser diode.

6. The sight of claim 4 wherein said controller includes a microprocessor.

7. The sight of claim 2 further including said controller operating said laser in timed pulsing relationship to gating on and off of said tube device to provide an image of said scene as illuminated by pulses of light from said laser.

8. A method of operating a viewing device, said method comprising steps of:
  providing a tube device for receiving light from a distant scene and utilizing said tube device to responsively providing an output;
  providing a laser having a temperature of operation and projecting laser light into the distant scene;
  utilizing the temperature of operation of said laser to control the wavelength of laser light produced by said laser, and controlling said temperature of operation of said laser substantially to a selected one of at least two differing temperatures, said laser providing laser light of a corresponding one of two differing wavelengths;
  providing at least a pair of optical band-pass filters each passing a respective wavelength of light corresponding to a respective one of said two differing wavelengths.

9. The method of claim 8 in which said step of controlling said temperature of operation of said laser includes providing a temperature sensor responsive to said temperature of said laser to provide a temperature signal, providing a heater in heat transfer relation to the laser, and providing a controller receiving said temperature signal and controlling said heater.

10. The method of claim 8 further including the step of providing said tube device with an output electrode, and including in said output electrode a phosphor screen providing a visible output.

11. The method of claim 8 including the step of including in said laser a laser diode.

12. The method of claim 9 further including the step of providing a mass of material having a high heat transfer coefficient, providing said mass of material with means for mounting said laser in heat transfer relation, disposing said heater in heat transfer relation with said mass of material, and controllably operating said heater to stabilize the temperature of said mass of material and of said laser at said selected one of said at least two differing temperatures.

13. The method of claim 12 further including the step of providing a mass of insulating material surrounding said mass of material, and defining a passage in said mass of insulating material allowing for passage outwardly of laser light from said laser.

14. The method of claim 9 including the step of including in said controller a microprocessor.

15. The method of claim 8 further including the step of controlling operating said laser in timed pulsing relationship to controlled gating on and off of said tube device to provide an image of said scene as illuminated by pulses of light from said laser.

16. An observation device including a laser having a temperature of operation and projecting laser light into a scene to provide an image by operation of the device, the laser light having a wavelength dependent upon said temperature of operation of the laser; said observation device comprising:
  an objective lens receiving light from the scene;
  an image intensifier tube receiving light from the scene via the objective lens, and responsively providing a visible image;
  an eyepiece lens providing the visible image to a user of the device;
  said laser projecting pulses of laser light into the scene to illuminate this scene and provide an image;
  at least a duality of spectral band-pass optical filters selectively movable to pass light between said objective lens and said image intensifier tube; and
  heat control means responsive to ambient temperature to control said temperature of operation of said laser above ambient temperature to one of at least a duality of temperatures;
  whereby said operating temperature of said laser is controlled to one of said at least a duality of temperatures dependent upon ambient temperature in order to decrease heat loss from said laser and said heat control means to ambient.

17. The device of claim 16 wherein said heat control means includes a mass of material having a high coefficient of heat transfer and defining means to receive and isolate said laser from ambient temperature, a heater in heat transfer relation with said mass of material, a controller controlling said heater to maintain said mass of material at said selected one of said at least a duality of temperatures dependent upon ambient temperature, and a mass of insulation surrounding said mass of material and further isolating said laser from ambient temperature.

* * * * *